US010723814B2

(12) United States Patent
Dronet et al.

(10) Patent No.: US 10,723,814 B2
(45) Date of Patent: Jul. 28, 2020

(54) TIRE COMPRISING A RUBBER COMPOSITION INCLUDING A SUBSTITUTED DIENE ELASTOMER

(71) Applicant: COMPAGNIE GENERALE DES ETABLISSEMENTS MICHELIN, Clermont-Ferrand (FR)

(72) Inventors: Séverin Dronet, Clermont-Ferrand (FR); Corentin Pavageau, Clermont-Ferrand (FR); Benoît Schnell, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 213 days.

(21) Appl. No.: 16/064,451

(22) PCT Filed: Dec. 22, 2016

(86) PCT No.: PCT/FR2016/053647
§ 371 (c)(1),
(2) Date: Jun. 20, 2018

(87) PCT Pub. No.: WO2017/109427
PCT Pub. Date: Jun. 29, 2017

(65) Prior Publication Data
US 2019/0002599 A1 Jan. 3, 2019

(30) Foreign Application Priority Data
Dec. 22, 2015 (FR) ...................... 15 63072

(51) Int. Cl.
C08C 19/25 (2006.01)
B60C 11/00 (2006.01)
B60C 1/00 (2006.01)
C08C 19/20 (2006.01)
C08L 15/00 (2006.01)
C08C 19/00 (2006.01)

(52) U.S. Cl.
CPC ............ C08C 19/25 (2013.01); B60C 1/0016 (2013.01); B60C 11/0008 (2013.01); C08C 19/00 (2013.01); C08C 19/20 (2013.01); C08L 15/00 (2013.01)

(58) Field of Classification Search
CPC ..... C08C 19/25; C08C 19/20; B60C 11/0008; B60C 1/0016
See application file for complete search history.

(56) References Cited

U.S. PATENT DOCUMENTS

| 6,610,261 | B1 | 8/2003 | Custodero et al. |
| 6,774,255 | B1 | 8/2004 | Tardivat et al. |
| 2002/0004549 | A1 | 1/2002 | Custodero et al. |
| 2003/0004287 | A1 | 1/2003 | Barbotin et al. |
| 2003/0130535 | A1 | 7/2003 | Deschler et al. |
| 2003/0212185 | A1 | 11/2003 | Vasseur |
| 2004/0051210 | A1 | 3/2004 | Tardivat et al. |
| 2004/0132880 | A1 | 7/2004 | Durel et al. |
| 2005/0004297 | A1 | 1/2005 | Durel et al. |
| 2005/0016650 | A1 | 1/2005 | Durel et al. |
| 2005/0016651 | A1 | 1/2005 | Durel et al. |
| 2005/0239639 | A1 | 10/2005 | Monteil et al. |
| 2006/0160969 | A1 | 7/2006 | Boisson et al. |
| 2008/0009564 | A1 | 1/2008 | Robert et al. |
| 2008/0156404 | A1 | 7/2008 | Brunelet et al. |
| 2009/0186961 | A1 | 7/2009 | Araujo Da Silva et al. |
| 2009/0209709 | A1 | 8/2009 | Araujo Da Silva et al. |
| 2009/0234066 | A1 | 9/2009 | Araujo Da Silva et al. |
| 2009/0292063 | A1 | 11/2009 | Robert et al. |
| 2015/0029937 | A1 | 1/2015 | Tamura |
| 2015/0315356 | A1 | 11/2015 | Schnell et al. |
| 2015/0353716 | A1 | 12/2015 | Thuilliez et al. |

FOREIGN PATENT DOCUMENTS

| EP | 0526955 | A1 | 2/1993 | |
| EP | 1092731 | A1 | 4/2001 | |
| EP | 1674520 | A1 * | 6/2006 | ............. C08K 13/04 |
| EP | 1674520 | A1 | 6/2006 | |
| EP | 2765145 | A1 * | 8/2014 | ............... C08K 5/14 |
| EP | 2765145 | A1 | 8/2014 | |
| FR | 3000073 | A1 * | 6/2014 | ............. C08C 19/20 |
| FR | 3000073 | A1 | 6/2014 | |
| FR | 3001223 | A1 | 7/2014 | |
| WO | 9637547 | A2 | 11/1996 | |
| WO | 9909036 | A1 | 2/1999 | |
| WO | 9928380 | A1 | 6/1999 | |
| WO | 0210269 | A2 | 2/2002 | |
| WO | 0230939 | A1 | 4/2002 | |
| WO | 0231041 | A1 | 4/2002 | |

(Continued)

OTHER PUBLICATIONS

French Search Report regarding French Application No. FR 1563072 dated May 17, 2016.

(Continued)

Primary Examiner — Robert D Harlan
(74) Attorney, Agent, or Firm — Dickinson Wright PLLC

(57) ABSTRACT

A tire comprising a rubber composition comprising a substituted diene elastomer is provided. The substituted diene elastomer comprises units bearing an A-B radical, in which:
A represents an aliphatic $C_3$-$C_{35}$ radical which can be interrupted by one or more heteroatom(s), and
B represents a linear, branched or cyclic $C_1$-$C_6$ hydrocarbon radical.
A and B are such that the melting point of the analogue, H-A-B, is less than 70° C., and the substituted diene elastomer comprises from 10% to 40% by weight of the A-B radical, with respect to the total weight of the elastomer.
A tread comprising such a rubber composition is also provided.
A rubber composition comprising such a substituted diene elastomer and at least one of the following constituents: a second diene elastomer; a reinforcing filler and, if appropriate, a coupling agent is also provided.

21 Claims, No Drawings

(56) References Cited

FOREIGN PATENT DOCUMENTS

| WO | 02083782 A1 | 10/2002 |
|---|---|---|
| WO | 03002648 A1 | 1/2003 |
| WO | 03002649 A1 | 1/2003 |
| WO | 03016387 A1 | 2/2003 |
| WO | 2004035639 A1 | 4/2004 |
| WO | 2005028526 A1 | 3/2005 |
| WO | 2005087859 A1 | 9/2005 |
| WO | 2006023815 A2 | 3/2006 |
| WO | 2006061064 A1 | 6/2006 |
| WO | 2006125532 A1 | 11/2006 |
| WO | 2006125533 A1 | 11/2006 |
| WO | 2006125534 A1 | 11/2006 |
| WO | 2007017060 A1 | 2/2007 |
| WO | 2014082919 A1 | 6/2014 |
| WO | 2014114607 A1 | 7/2014 |

OTHER PUBLICATIONS

International Search Report and Written Opinion regarding Application No. PCT/FR2016/053647 dated Jul. 12, 2017.
International Search Report regarding Application No. PCT/FR2016/053538 dated Mar. 20, 2017.
Angew. Chem. Int. Ed. 2005, 44, 2593-2596; Julien Thuilliez, et al.; Alternating Copolymerization of Ethylene and Butadiene with a Neodymocene Catalyst**.
Adsorption of Gases in Multimolecular Layers by Stephen Brunauer, et al., pp. 309-319; Feb. 1938, (Contribution from the Bureau of Chemistry and Soils and George Washington University); Adsorption of Gases in Multimolecular Layers.

* cited by examiner

TIRE COMPRISING A RUBBER COMPOSITION INCLUDING A SUBSTITUTED DIENE ELASTOMER

This application is a 371 national phase entry of PCT/FR2016/053647 filed on 22 Dec. 2016, which claims benefit of French Patent Application No. 1563072, filed 22 Dec. 2015, the entire contents of which are incorporated herein by reference for all purposes.

BACKGROUND

1. Technical Field

The present invention relates to tires comprising rubber compositions intended in particular for the manufacture of tires or of semifinished products for tires. The invention more particularly relates to the plasticizing systems which can be used for the plasticizing of such rubber compositions.

2. Related Art

Rubber composition for tires comprise, in a known way, plasticizing agents used to improve the processability of the said compositions in the raw state, and also some of their operating properties in the cured state, such as, for example, in the case of treads of tires, their wet grip.

Various plasticizers of different chemical natures can be added to rubber compositions comprising a diene elastomer, in particular in order to shift the glass transition temperature (Tg) of an elastomer.

However, it should be noted that the use of a plasticizer can confer compatibility problems.

SUMMARY

The inventors provide tires comprising rubber compositions incorporating diene elastomers comprising units, distributed along the chain, bearing an aliphatic radical acting as plasticizer. It has been found, surprisingly, that, when the plasticizer is grafted to a diene elastomer chain, it is possible:

to increase the compatibility of the plasticizer, in particular its impact on the Tg of the polymer, and to prevent crystallization of the plasticizer, in comparison with the same free plasticizer, to avoid phenomena of exudation of the plasticizers. In a tire comprising a rubber composition based on a diene elastomer and on a plasticizer, phenomena of exudation of the plasticizers towards the outside of the tire or towards the internal mixtures may be observed, which reduces the amount of plasticizer in the material under consideration and thus modifies its performance qualities over time; this can also modify the performance qualities of the other areas into which the plasticizer will migrate.

Furthermore, the presence, in the rubber composition, of plasticizer grafted to a diene elastomer chain makes it possible to confer an improved endurance on a tire casing incorporating this rubber composition in its tread, owing to the fact that the migration of the plasticizers into the adjacent mixtures of the casing is reduced, and consequently to minimize the detrimental change in the properties of the said mixtures, such as their stiffness and their resistance to cracking, which makes it possible to improve the resistance of the casing to the separation of the triangulation crown plies which it comprises in its crown reinforcement (this resistance to the separation of the plies is sometimes known as resistance to splitting by a person skilled in the art).

A subject-matter of the invention is a tire comprising a rubber composition comprising a substituted diene elastomer, characterized in that the said substituted diene elastomer comprises units bearing an A-B radical, in which:

A represents an aliphatic $C_3$-$C_{35}$ radical which can be interrupted by one or more heteroatom(s)

B represents a linear, branched or cyclic $C_1$-$C_6$ hydrocarbon radical

A and B are such that the melting point of the analogue, H-A-B, is less than 70° C. and the substituted diene elastomer comprises from 10% to 40% by weight of the said A-B radical, with respect to the total weight of the elastomer.

Advantageously, A represents a $C_{10}$-$C_{25}$ radical which can be interrupted by one or more heteroatom(s). In particular, A represents a linear $C_{10}$-$C_{25}$ alkylene radical.

Advantageously, B represents a methyl, cyclopentyl or cyclohexyl radical.

The A-B radical can be bonded to the chain of the elastomer via a sulfur atom or a silicon atom.

In a first alternative form, the elastomer comprises pendant groups distributed along the chain of following formula (1): *—$SiR_1R_2$-A-B with:
R1 and R2, which are identical or different, each representing a C1-C5 alkyl, C6-C14 aryl or C7-C11 aromatic alkyl group;
A and B being as defined above;
* denoting a point of bonding with the elastomer chain.

In this alternative form, the substituted diene elastomer is advantageously obtained by hydrosilylation of a diene elastomer E, by reacting the said diene elastomer E with a hydrosilane of formula (2) H—$SiR_1R_2$-A-B, where A, B, $R_1$ and $R_2$ are as defined above, in the presence of a hydrosilylation catalyst.

In a second alternative form, the elastomer comprises pendant groups distributed along the chain of following formula (3): *—S-A-B with:
A and B being as defined above;
* denoting a point of bonding with the elastomer chain.

In this alternative form, the substituted diene elastomer is advantageously obtained by reacting a diene elastomer E with a thiol of formula (4) HS-A-B, where A and B are as defined above, in the presence of a radical initiator.

In one or the other of these alternative forms, the diene elastomer E is advantageously one of the following polymers:

(a) any homopolymer obtained by polymerization of a conjugated diene monomer having from 4 to 12 carbon atoms;

(b) any copolymer obtained by copolymerization of one or more of the conjugated dienes with one another or with one or more ethylenically unsaturated monomers;

(c) any homopolymer obtained by polymerization of a non-conjugated diene monomer having from 5 to 12 carbon atoms;

(d) any copolymer obtained by copolymerization of one or more of the non-conjugated dienes with one another or with one or more ethylenically unsaturated monomers;

(e) a ternary copolymer obtained by copolymerization of ethylene and of an α-olefin having from 3 to 6 carbon atoms with a non-conjugated diene monomer having from 6 to 12 carbon atoms;

(f) a copolymer of isobutene and of isoprene (butyl rubber), and also the halogenated versions;
(g) natural rubber;
(h) an unsaturated olefinic copolymer, the chain of which comprises at least olefinic monomer units and diene units;
(i) a mixture of several of the elastomers defined from (a) to (h) with one another.

In particular, the conjugated diene monomer is 1,3-butadiene, 2-methyl-1,3-butadiene, 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene, 1,3-pentadiene or 2,4-hexadiene.

More particularly, the diene elastomer E is chosen from:
polybutadienes (abbreviated to "BRs"),
synthetic polyisoprenes (IRs),
natural rubber (NR),
random butadiene copolymers, random isoprene copolymers, random ethylene/diene copolymers, more preferably selected from the group consisting of butadiene/styrene copolymers (SBRs), isoprene/butadiene copolymers (BIRs), isoprene/styrene copolymers (SIRs), isoprene/butadiene/styrene copolymers (SBIRs) and ethylene/butadiene copolymers (EBRs), and
the mixtures of these elastomers.

The rubber composition advantageously comprises from 50% to 70% by weight of the substituted elastomer according to embodiments of the invention.

The rubber composition advantageously comprises from 45 to 160 phr of reinforcing filler.

Advantageously, the rubber composition also comprises a second diene elastomer.

In particular, the rubber composition according to embodiments of the invention makes up the tread.

Another subject-matter of the invention is a tread comprising a rubber composition according to embodiments of the invention.

Another subject-matter of the invention is a rubber composition comprising a substituted diene elastomer according to embodiments of the invention and at least one of the following constituents:
a second diene elastomer
a reinforcing filler and, if appropriate, a coupling agent.

II—OUTLINE OF THE MEASUREMENT METHODS USED AND DEFINITIONS

Any interval of values denoted by the expression "between a and b" represents the range of values extending from more than a to less than b (that is to say, limits a and b excluded), whereas any interval of values denoted by the expression "from a to b" means the range of values extending from a to b (that is to say, including the strict limits a and b).

In the present description, unless expressly indicated otherwise, all the percentages (%) shown are percentages by weight.

Furthermore, the term "phr" means, within the meaning of embodiments of the invention, parts by weight per hundred parts of total elastomer. When the elastomer is grafted, the weight of the elastomer and of the graft are taken into consideration.

In the present description, the expression "along the chain" with reference to the units comprising the radical of formula A-B should be understood as meaning that the elastomer comprises units of this type in several places on the elastomer chain. This includes the end or ends of the chain but is not limited to these locations. When a unit comprising the radical of formula A-B is present at at least one chain end, the elastomer also comprises at least one other unit of this type at another position in the chain.

In the present description, the expression "graft" should be understood as meaning the side block comprising the radical of formula A-B, defined subsequently, introduced onto the backbone of the elastomer by grafting.

Furthermore, the expression "substituted elastomer" should be understood as meaning an elastomer comprising units bearing the said A-B radical.

The expression composition "comprising" or "based on" should be understood as meaning a composition comprising the mixture and/or the reaction product of the various constituents used, some of these base constituents being capable of reacting or intended to react with one another, at least in part, during the various phases of manufacture of the composition, in particular during the crosslinking or vulcanization thereof.

In the context of embodiments of the invention, use may be made of carbon products resulting from biomass or resulting from non-renewable (fossil) origin. Thus, the carbon products are of fossil or biosourced origin. In the latter case, they may partially or completely result from biomass or be obtained from renewable starting materials resulting from biomass. Polymers, plasticizers, fillers, and the like, are concerned in particular.

Size Exclusion Chromatography

Preparation of the polymer: There is no specific treatment of the polymer sample before analysis. The latter is simply dissolved, in tetrahydrofuran with 1 vol % of distilled water, at a concentration of approximately 1 g/l. The solution is then filtered through a filter with a porosity of 0.45 µm before injection.

The apparatus used is a Waters Alliance chromatograph. The elution solvent is tetrahydrofuran. The flow rate is 0.7 ml/min, the temperature of the system is 35° C. and the analytical time is 90 min. A set of four Waters columns in series, with commercial names Styragel HMW7, Styragel HMW6E and two Styragel HT6E, is used.

The volume of the solution of the polymer sample injected is 100 µl. The detector is a Waters 2410 differential refractometer and the software for making use of the chromatographic data is the Waters Empower system.

The calculated average molar masses are relative to a calibration curve produced from PSS Ready Cal-Kit commercial polystyrene standards.

Microstructure and Graft Content by NMR

The contents of the different monomer units and the microstructure of the copolymer are determined by an NMR analysis. The spectra are acquired on a Bruker 500 MHz spectrometer equipped with a 5 mm BBI Z-grad broad band probe. The quantitative $^1$H NMR experiment uses a simple 30° pulse sequence and a repetition time of 5 seconds between each acquisition. The samples are dissolved in $CDCl_3$.

DSC Analysis: Measurement of Tg, of the Enthalpy of Fusion and of the Melting Point The melting points, enthalpies of fusion and glass transition temperatures Tg of the polymers are measured using a differential scanning calorimeter. The analysis is carried out according to the requirements of Standard ASTM D3418-08 and Standard ISO 11357-3: 2011.

The same method (Standard ASTM D3418-08 and Standard ISO 11357-3: 2011) is used to determine the melting point of the compound H-A-B, defined below.

Measurement of the Stiffness (G*)

The linear viscoelastic properties of these materials are measured by low strain (0.1%) sinusoidal shearing. The measures are carried out on an MCR301 (Anton Paar) controlled-strain rheometer with a parallel plate-plate geometry (diameter of 20 mm). The experiments are carried out under a nitrogen atmosphere. The samples are moulded at 100° C. (diameter 25 mm, thickness approximately 2 mm) for 5 minutes, then cut to a diameter of 20 mm with a hollow punch. The elastic storage modulus G', the viscous modulus G" and the loss factor tan δ are measured during a temperature sweep at 5° C./min between −60° C. and 100° C. The rheometer is calibrated and the samples are carefully loaded in order to ensure reproducible results, the recommendations described in C. W. Macosko, Rheology: Principles, Measurements, and Applications. New York, Wiley-VCH, 1994, being followed.

III—DETAILED DESCRIPTION OF EXAMPLE EMBODIMENTS

A subject-matter of the invention is a tire comprising a rubber composition comprising a substituted diene elastomer, characterized in that the said substituted diene elastomer comprises units bearing an A-B radical, in which:

A represents an aliphatic $C_3$-$C_{35}$ radical which can be interrupted by one or more heteroatom(s)

B represents a linear, branched or cyclic $C_1$-$C_6$ hydrocarbon radical

A and B are such that the melting point of the analogue, H-A-B, is less than 70° C. and the substituted diene elastomer comprises from 10% to 40% by weight of the said A-B radical, with respect to the total weight of the elastomer.

Thus, the rubber composition is based on a substituted diene elastomer according to embodiments of the invention and on the optional other compounds described subsequently.

III.1. Substituted Diene Elastomer:

An aliphatic radical denotes a saturated or unsaturated hydrocarbon radical which is linear or branched or cyclic or which can comprise one or more rings. The hydrocarbon radical can be a linear, branched or cyclic alkylene, alkenylene, alkynylene, alkyl, alkenyl or alkynyl radical. The term "cyclic" is understood to mean, within the meaning of embodiments of the present invention, that the radical comprises one or more saturated divalent cyclic hydrocarbon groups, each comprising from 3 to 8 cyclic carbon atoms, advantageously with the exception of the epoxide group. In the case of the A radical, the hydrocarbon radical can additionally contain one or more heteroatoms, such as, for example, N, O or Si. In the case of the B radical, the hydrocarbon radical comprises only carbon and hydrogen atoms.

In an advantageous alternative form, none of the A or B radicals comprises an epoxide ring.

According to a preferred embodiment, the radical A is a linear, branched or cyclic $C_{10}$-$C_{25}$ alkylene radical, which can be interrupted by one or more heteroatom(s), such as, for example, N, O or Si. In particular, A represents a linear $C_{10}$-$C_{25}$ alkylene radical.

B advantageously represents a methyl, cyclopentyl or cyclohexyl radical.

The compound H-A-B has a melting point of less than 70° C., advantageously of less than 50° C.

Advantageously, the A-B radical is bonded to the chain of the elastomer via a sulfur atom or a silicon atom.

In a first alternative form, the elastomer comprises pendant groups distributed along the chain of following formula (1): *—$SiR_1R_2$-A-B with:

$R_1$ and $R_2$, which are identical or different, each representing a $C_1$-$C_5$ alkyl, $C_6$-$C_{14}$ aryl or $C_7$-$C_{11}$ aromatic alkyl group;

A and B being as defined above;

* denoting a point of bonding with the elastomer chain.

According to alternative forms, in the formula (1), $R_1$ and $R_2$, which are identical or different, preferably denote a $C_1$-$C_5$ alkyl group. In particular, $R_1$ and $R_2$, which are identical or different, each represent a methyl or ethyl group.

In this first alternative form, the substituted diene elastomer is advantageously obtained by hydrosilylation of a diene elastomer E, by reacting the said diene elastomer E with a hydrosilane of following formula (2):

where A, B, $R_1$ and $R_2$ are as defined above, in the presence of a hydrosilylation catalyst.

Thus, according to embodiments of the invention, the hydrosilane of formula (2) reacts by hydrosilylation with the unsaturations of an unsaturated diene elastomer E.

In a second alternative form, the elastomer comprises pendant groups distributed along the chain of following formula (3): *—S-A-B with:

A and B being as defined above;

* denoting a point of bonding with the elastomer chain.

In this second alternative form, the substituted diene elastomer is advantageously obtained by reacting a diene elastomer E with a thiol of formula (4) HS-A-B, where A and B are as defined above, in the presence of a radical initiator.

Thus, according to embodiments of the invention, the thiol of formula (4) reacts by a thiol-ene reaction with the unsaturations of an unsaturated diene elastomer E.

In one or the other of these alternative forms, diene elastomer should be understood, according to embodiments of the invention, as meaning any elastomer resulting at least in part (i.e., a homopolymer or a copolymer) from diene monomers (monomers bearing two conjugated or non-conjugated carbon-carbon double bonds). The diene elastomer E according to embodiments of the invention comprises unsaturations of carbon-carbon double bond type. The elastomer E according to the invention preferably exhibits, among other unsaturations, pendant unsaturations along the chain. According to some alternative forms, these pendant unsaturations are unsaturations which are said to be of vinyl origin. Unsaturations of vinyl origin refer to pendant unsaturations of the polymer chain originating from an insertion of vinyl type of the diene monomer into the elastomer. Mention may be made, by way of examples of unsaturations of vinyl origin, of those originating from an insertion of 1,2-type, for example of butadiene, isoprene or any other diene having a $C_1$ unsaturation (that is to say, any other diene for which one of the double bonds is terminal), or else insertions of 3,4-type of isoprene, for example, and the like.

According to preferred alternative forms, any diene elastomer comprising at least unsaturated units, a portion of which results from an insertion of the conjugated or non-conjugated diene monomer resulting in a pendant unsaturation, is suitable according to embodiments of the invention as elastomer E, in particular, according to some of these alternative forms, any diene elastomer comprising at least unsaturated units, a portion of which results from a vinyl insertion.

In particular, the unsaturated diene elastomer E according to embodiments of the invention comprises pendant unsaturations along the chain. The content by weight of the monomer units bearing these unsaturations, which units are denoted F, then varies within a range which makes it possible to achieve the desired content by weight of pendant groups of formula (1), it being noted that the modification to the unsaturations can be quantitative by the hydrosilylation reaction or by the thiol-ene reaction in the presence of an excess of thiol. In these alternative forms, the diene elastomers appropriate for being employed in the process of embodiments of the invention are those for which the content by weight of unsaturated monomer units F corresponds to the following formula:

$$\% F \geq \% G \times M(F)/M(G)$$

where:
% F denotes the percentage by weight of unsaturated monomer units F, with respect to the total weight of the elastomer E,
% G denotes the percentage by weight of groups of formula (2) or (4) which it is desired to introduce, with respect to the total weight of the elastomer E,
M(G) denotes the molar mass of the group of formula (2) or (4),
M(F) denotes the molar mass of the unsaturated monomer unit F.

The diene elastomers appropriate for being employed in the process of embodiments of the invention can also be highly unsaturated, with a content by weight of unsaturated monomer units of greater than 20% and which can reach 100%, with respect to the total weight of the elastomer.

Diene elastomer capable of being used in embodiments of the invention is understood more particularly to mean a diene polymer, which is an elastomer, corresponding to one of the following categories:
(a) any homopolymer obtained by polymerization of a conjugated diene monomer having from 4 to 12 carbon atoms;
(b) any copolymer obtained by copolymerization of one or more of the abovementioned conjugated dienes with one another or with one or more ethylenically unsaturated monomers;
(c) any homopolymer obtained by polymerization of a non-conjugated diene monomer having from 5 to 12 carbon atoms;
(d) any copolymer obtained by copolymerization of one or more of the abovementioned non-conjugated dienes with one another or with one or more ethylenically unsaturated monomers;
(e) a ternary copolymer obtained by copolymerization of ethylene and of an α-olefin having from 3 to 6 carbon atoms with a non-conjugated diene monomer having from 6 to 12 carbon atoms, such as, for example, the elastomers obtained from ethylene and propylene with a non-conjugated diene monomer, such as described in particular in the documents WO 2004/035639A1 and US 2005/0239639A1;
(f) a copolymer of isobutene and of isoprene (butyl rubber) and also the halogenated versions, in particular chlorinated or brominated versions, of this type of copolymer:
(g) natural rubber;
(h) an unsaturated olefinic copolymer, the chain of which comprises at least olefinic monomer units, that is to say units resulting from the insertion of at least one monoolefin, and diene units resulting from at least one conjugated diene;
(i) a mixture of several of the elastomers defined from (a) to (h) with one another.

Mention may be made, as conjugated diene monomer appropriate for the synthesis of the polymers (a), (b) and (h), of 1,3-butadiene, 2-methyl-1,3-butadiene, 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene, 1,3-pentadiene or 2,4-hexadiene.

Mention may be made, as non-conjugated diene monomer appropriate for the synthesis of the polymers (c), (d) and (e), of 1,4-pentadiene, 1,4-hexadiene, ethylidenenorbornene or dicyclopentadiene.

Mention may be made, as ethylenically unsaturated monomers capable of playing a part in the copolymerization with one or more conjugated or non-conjugated diene monomers, in order to synthesize the copolymers (b) or (d), of:
vinylaromatic compounds having from 8 to 20 carbon atoms, such as, for example, styrene, ortho-, meta- or para-methylstyrene, the vinylmesitylene commercial mixture, divinylbenzene or vinylnaphthalene;
vinyl nitrile monomers having from 3 to 12 carbon atoms, such as, for example, acrylonitrile or methacrylonitrile;
acrylic ester monomers derived from acrylic acid or methacrylic acid with alcohols having from 1 to 12 carbon atoms, such as, for example, methyl acrylate, ethyl acrylate, propyl acrylate, n-butyl acrylate, isobutyl acrylate, 2-ethylhexyl acrylate, methyl methacrylate, ethyl methacrylate, n-butyl methacrylate or isobutyl methacrylate.

The copolymers (b) or (d) can contain between 99% and 1% by weight of diene units and between 1% and 99% by weight of vinylaromatic, vinyl nitrile and/or acrylic ester units.

Mention may be made, as monoolefin monomer appropriate for the synthesis of the polymers (h), of ethylene an α-olefin having from 3 to 6 carbon atoms, for example propylene. Preferably, the monoolefin monomer is ethylene.

According to certain alternative forms, the olefinic copolymer (h) capable of being used in the process of the invention is a copolymer, the chain of which comprises olefinic monomer units, that is to say units resulting from the insertion of at least one monoolefin, and diene units resulting from at least one conjugated diene. According to these alternative forms, other units resulting, for example, from an ethylenically unsaturated monomer as described above are present in the carbon chain.

According to certain alternative forms, the olefinic monomer units in the polymer (h) are predominant; more preferably, the molar content of these units is greater than 50%, with respect to the polymer. Among these alternative forms, the molar content can be at least 65%. Such elastomers and the processes for the synthesis thereof are described in Applications EP 1 092 731, EP 1 554 321, EP 1 656 400, EP 1 954 705, EP 1 957 506 and FR 13/50557 on behalf of the Applicant Companies.

Mention may be made, among the diene elastomers resulting from at least one conjugated diene monomer which are used in the context of the modification process according to embodiments of the invention, as non-exclusive examples, of polybutadiene, polyisoprene, polychloroprene, polyisobutylene, random copolymers of butadiene with styrene (SBR) and acrylonitrile (NBR) and their partially hydrogenated versions, random copolymers of isoprene with styrene (SIR), random copolymers of isoprene and butadiene with styrene (SBIR), butyl or halogenated butyl rubbers, ethylene/propylene/diene (EPDM) terpolymers, ethylene/diene copolymers and their mixtures.

Among these, the diene elastomer or elastomers used in embodiments of the invention are very particularly selected from the group of the diene polymers consisting of polybutadienes (abbreviated to "BRs"), synthetic polyisoprenes (IRs), natural rubber (NR), butadiene copolymers, isoprene copolymers, ethylene/diene copolymers and the mixtures of these polymers. Such copolymers are more preferably selected from the group consisting of butadiene/styrene copolymers (SBRs), isoprene/butadiene copolymers (BIRs), isoprene/styrene copolymers (SIRs), isoprene/butadiene/styrene copolymers (SBIRs) and ethylene/butadiene (EBR) copolymers.

The elastomers which can be used according to embodiments of the invention can be obtained according to conventional polymerization techniques well known to a person skilled in the art. The elastomers advantageously have a random microstructure. The elastomers can be prepared in dispersion, in emulsion or in solution.

The substituted diene elastomers used in embodiments of the invention can be prepared by reaction of a diene elastomer E, as defined above, with a hydrosilane of formula (2) or with a thiol of formula (4), as defined above, in the presence respectively of a hydrosilylation catalyst or of a radical initiator.

Prior to the reaction for grafting by hydrosilylation, the process advantageously comprises the dissolution, in a nonpolar solvent, of at least one unsaturated diene elastomer E, a hydrosilane of formula (2) and a hydrosilylation catalyst. This dissolution can be carried out according to any implementation available to a person skilled in the art. According to one implementation, the unsaturated elastomer, the hydrosilane of formula (2) and the catalyst are dissolved in the nonpolar solvent with stirring.

Use may be made, as nonpolar solvent, of any inert hydrocarbon solvent, which can, for example, be an aliphatic or alicyclic hydrocarbon, such as pentane, hexane, heptane, isooctane, cyclohexane or methylcyclohexane, or an aromatic hydrocarbon, such as benzene, toluene or xylene, and also their mixtures. Preferably, methylcyclohexane or toluene is used.

Use may be made, as catalyst, of any catalyst known for the catalysis of hydrosilylation based on transition metals generally from Group VIII, such as platinum, palladium, rhodium, ruthenium, iron and the like. The choice will preferably be made, among these different catalysts employed for the hydrosilylation reaction, of platinum-based catalysts, such as hexachloroplatinic acid hexahydrate (Speier's catalyst) and the catalyst platinum-1,1,3,3-tetramethyl-1,3-divinylsiloxane (Karstedt's catalyst), and more preferably of Karstedt's catalyst. The catalyst can be added to the reaction mixture in any standard form but preferably in the form of a solution in a solvent.

Preferably, the amount of total solvent, or of solvent of the reaction medium, is such that the concentration by weight of elastomer is between 1% and 40% by weight, preferably between 2% and 20% and more preferably still between 2% and 10% in the said solvent. Total solvent, or solvent of the reaction medium, is understood to mean all of the solvents used to dissolve the unsaturated elastomer, the hydrosilane of formula (2) and the hydrosilylation catalyst.

The process according to embodiments of the invention can advantageously comprise a stage of heating the homogeneous reaction mixture obtained in the preceding stage to the grafting reaction temperature. The grafting reaction temperature is at least 20° C. and at most 120° C.; preferably, it is at least 50° C., indeed even at least 60° C., and at most 100° C., indeed even at most 90° C.

Prior to the reaction for grafting by a thiol-ene reaction, the process advantageously comprises the dissolution, in a mixture comprising at least one polar solvent and at least one nonpolar solvent, of at least one unsaturated diene elastomer E, a thiol of formula (4) and a radical initiator. This dissolution can be carried out according to any implementation available to a person skilled in the art. According to one implementation, the unsaturated elastomer, the thiol of formula (4) and the radical initiator are dissolved, with stirring, in the mixture comprising at least one polar solvent and at least one nonpolar solvent.

This dissolution can be carried out according to any implementation available to a person skilled in the art. According to one implementation, the elastomer is dissolved in the nonpolar solvent and is mixed, with stirring, with the thiol of formula (4) dissolved in the polar solvent. Conversely, the thiol of formula (4), in solution in the polar solvent, is mixed with the elastomer, in solution in the nonpolar solvent, with stirring.

The solvent consists of a mixture comprising at least one polar solvent and at least one nonpolar solvent. Preferably, the polar solvent and the nonpolar solvent are miscible.

Use may be made, as nonpolar solvent, of any inert hydrocarbon solvent, which can, for example, be an aliphatic or alicyclic hydrocarbon, such as pentane, hexane, heptane, isooctane, cyclohexane or methylcyclohexane, or an aromatic hydrocarbon, such as benzene, toluene or xylene, and also their mixtures. Preferably, methylcyclohexane or toluene is used.

Use may be made, as polar solvent, of any polar solvent, such as a nitrogenous compound of amine or nitrogenous heterocycle type, a ketone, a sulfoxide, an ether or a halogenated solvent of chloroform, dichloromethane, dichloroethane or tetrachloroethane type, and the like, and also their mixtures. Preferably, dichloromethane or THF (tetrahydrofuran) is used.

The process advantageously comprises a stage of heating the homogeneous reaction mixture obtained in the preceding stage to the grafting reaction temperature. The grafting reaction temperature is at least 20° C. and at most 120° C.; preferably, it varies from 50° C. to 100° C. and more preferably still from 60° C. to 90° C.

The process according to embodiments of the invention advantageously comprises, once the grafting reaction temperature has been reached, the stage of addition of a radical initiator in order to bring about the grafting of the thiol of formula (4) to the units of the elastomer comprising unsaturations. Use may be made, according to embodiments of the invention, as radical initiator, of any initiator known to a person skilled in the art. Mention may be made, for example, of azobisisobutyronitrile or also of peroxides, it being known that, as the nature of the peroxide has no impact on the grafting yield, any peroxide can be envisaged. The radical initiator can be added to the reaction mixture in any standard form but preferably, however, in the form of a solution in a solvent. Preferably, the solvent for the radical initiator is identical to one at least of the solvents used to dissolve the thiol of formula (4) and the diene elastomer. Mention may thus be made, as such a solvent, of methylcyclohexane, tetrahydrofuran or dichloromethane.

The use of a mixture of polar and nonpolar solvents makes it possible to improve the yield of the grafting. The solvent of the reaction medium, namely the mixture of the polar and nonpolar solvents, including the solvent for the radical initiator, advantageously comprises at most 60% by volume of polar solvent, with respect to the volume of nonpolar solvent. Below this value, the grafting yield makes it possible to significantly reduce the disadvantages related to the presence of unreacted thiols. For example, the amount of polar solvent can be between 0% and 60% by volume, with respect to the total volume of nonpolar solvent. In addition, the amount of polar solvent, with respect to the mixture of solvents, is preferably at most 40% by volume, with respect to the total volume of nonpolar solvent, below which value it is possible to achieve a quantitative yield. According to another preferred aspect which can be combined with the preceding aspects, the solvent comprises at least 4% by volume of polar solvent, with respect to the total volume of nonpolar solvent. For example, the amount of polar solvent can vary from 4% to 60% by volume, with respect to the total volume of nonpolar solvent, preferably from 4% to 40% by volume.

Preferably, the amount of total solvent, or of solvent of the reaction medium, is such that the concentration by weight of elastomer is between 1% and 40% by weight, preferably between 2% and 20% and more preferably still between 2% and 10% in the said solvent.

According to one or the other of the grafting reactions, the degree of grafting can be adjusted in a way known to a person skilled in the art, by varying different operating conditions, such as in particular the amount of molecules to be grafted, the temperature or else the reaction time. It is possible to achieve quantitative grafting yields, both for the grafting by hydrosilylation and for the grafting by a thiol-ene reaction.

It should be noted that, in the context of embodiments of the invention, the alternative forms and the preferred aspects described above can be combined with one another.

In one or the other of the grafting reactions, at the end of the reaction, antioxidants can be added. Mention may in particular be made, as antioxidant, of phenolic antioxidants, such as 4,4'-methylenebis(2,6-di(tert-butyl)phenol), and amine antioxidants, such as N-(1,3-dimethylbutyl)-N'-phenyl-p-phenylenediamine.

The rubber composition advantageously comprises at least 30% by weight of the substituted diene elastomer according to embodiments of the invention, preferably at least 40% by weight, with respect to the total weight of the composition. Advantageously, the rubber composition comprises from 30% to 70% by weight of the substituted diene elastomer according to embodiments of the invention, more preferably from 40% to 70% by weight, with respect to the total weight of the composition.

The substituted diene elastomers according to embodiments of the invention can be used as is or as mixtures with one or more other compounds. The presence of pendant A-B radicals along the chain makes it possible:

to increase the compatibility of the plasticizer, in particular its impact on the Tg of the polymer, and to prevent crystallization of the plasticizer, in comparison with the same free plasticizer, to prevent exudation of the plasticizers towards the outside of the tire or towards the internal mixtures, which modifies the amount of plasticizer in the material under consideration and thus reduces its performance qualities over time; this can also modify the performance qualities of the other areas into which the plasticizer will migrate.

In the tire, the rubber composition can also comprise a second diene elastomer.

The content of the first diene elastomer (the substituted diene elastomer) is advantageously within a range extending from 50 to 100 phr, preferably from 60 to 100 phr, more preferably still from 80 to 100 phr and preferably of 100 phr. When the rubber composition of the tire in accordance with embodiments of the invention comprises a second diene elastomer, which is optional, this elastomer is different from the first diene elastomer in so far as it does not bear an A-B radical. Nevertheless, this second diene elastomer can have a microstructure or a macrostructure which can be identical to or different from that of the unsaturated diene elastomer E. It is used in a proportion ranging from 0 to 50 phr, preferably from 0 to 40 phr and more preferably still from 0 to 20 phr.

III.2. Reinforcing Filler:

In the tire, the rubber composition advantageously comprises a reinforcing filler.

The rubber composition can comprise any type of "reinforcing" filler known for its abilities to reinforce a rubber composition which can be used for the manufacture of tires, for example an organic filler, such as carbon black, a reinforcing inorganic filler, such as silica, with which is combined, in a known way, a coupling agent, or also a mixture of these two types of filler.

Such a reinforcing filler typically consists of nanoparticles, the (weight-)average size of which is less than a micrometre, generally less than 500 nm, most commonly between 20 and 200 nm, in particular and more preferably between 20 and 150 nm.

All carbon blacks, in particular the blacks conventionally used in tires or their treads ("tyre-grade" blacks), are suitable as carbon blacks. Among the latter, mention will more particularly be made of the reinforcing carbon blacks of the 100, 200 and 300 series, or the blacks of the 500, 600 or 700 series (ASTM grades), such as, for example, the N115, N134, N234, N326, N330, N339, N347, N375, N550, N683 and N772 blacks. These carbon blacks can be used in the isolated state, as commercially available, or in any other form, for example as support for some of the rubber additives used.

The term "reinforcing inorganic filler" should be understood here as meaning any inorganic or mineral filler, whatever its colour and its origin (natural or synthetic), also known as "white filler", "clear filler" or even "non-black filler", in contrast to carbon black, capable of reinforcing, by itself alone, without means other than an intermediate coupling agent, a rubber composition intended for the manufacture of pneumatic tires, in other words capable of replacing, in its reinforcing role, a conventional tire-grade carbon black; such a filler is generally characterized, in a known way, by the presence of hydroxyl (—OH) groups at its surface.

Mineral fillers of the siliceous type, preferably silica ($SiO_2$), are suitable in particular as reinforcing inorganic fillers. The silica used can be any reinforcing silica known to a person skilled in the art, in particular any precipitated or fumed silica exhibiting a BET specific surface and also a CTAB specific surface both of less than 450 $m^2/g$, preferably from 30 to 400 $m^2/g$, in particular between 60 and 300 $m^2/g$. Mention will be made, as highly dispersible precipitated silicas ("HDSs"), for example, of the Ultrasil 7000 and Ultrasil 7005 silicas from Degussa, the Zeosil 1165MP, 1135MP and 1115MP silicas from Rhodia, the Hi-Sil EZ150G silica from PPG, the Zeopol 8715, 8745 and 8755 silicas from Huber or the silicas with a high specific surface as described in Application WO 03/016387.

Mention will also be made, as reinforcing inorganic filler, of mineral fillers of the aluminous type, in particular alumina ($Al_2O_3$) or aluminium (oxide) hydroxides, or also of reinforcing titanium oxides, for example described in U.S. Pat. Nos. 6,610,261 and 6,747,087.

The physical state under which the reinforcing inorganic filler is provided is not important, whether in the form of a powder, of microbeads, of granules or else of beads. Of course, reinforcing inorganic filler is also understood to mean mixtures of different reinforcing inorganic fillers, in particular of highly dispersible silicas as described above.

A person skilled in the art will understand that use might be made, as filler equivalent to the reinforcing inorganic filler described in the present section, of a reinforcing filler of another nature, in particular organic nature, such as carbon black, provided that this reinforcing filler is covered with an inorganic layer, such as silica, or else comprises, at its surface, functional sites, in particular hydroxyl sites, requiring the use of a coupling agent in order to establish the bond between the filler and the elastomer. By way of example, mention may be made, for example, of carbon blacks for tires, such as described, for example, in patent documents WO 96/37547 and WO 99/28380.

In the present account, the BET specific surface is determined in a known way by gas adsorption using the Brunauer-Emmett-Teller method described in The Journal of the American Chemical Society, Vol. 60, page 309, February 1938, more specifically according to French Standard NF ISO 9277 of December 1996 (multipoint (5 point) volumetric method—gas: nitrogen—degassing: 1 hour at 160° C.—relative pressure p/po range: 0.05 to 0.17). The CTAB specific surface is the external surface determined according to French Standard NF T 45-007 of November 1987 (method B).

Preferably, the content of total reinforcing filler is between 45 and 160 phr. Above 160 phr, there exists a risk of increase in the hysteresis and thus in the rolling resistance of the tires.

In order to couple the reinforcing inorganic filler to the diene elastomer, use is made, in a well-known way, of an at least bifunctional coupling agent (or bonding agent) intended to provide a satisfactory connection, of chemical and/or physical nature, between the inorganic filler (surface of its particles) and the diene elastomer. Use is made in particular of organosilanes or polyorganosiloxanes which are at least bifunctional.

Use is made in particular of silane polysulfides, referred to as "symmetrical" or "asymmetrical" depending on their specific structure, such as described, for example, in Applications WO 03/002648 (or US 2005/016651) and WO 03/002649 (or US 2005/016650).

Mention will more particularly be made, as examples of silane polysulfides, of bis(($C_1$-$C_4$)alkoxyl($C_1$-$C_4$)alkylsilyl ($C_1$-$C_4$)alkyl) polysulfides (in particular disulfides, trisulfides or tetrasulfides), such as, for example, bis(3-trimethoxysilylpropyl) or bis(3-triethoxysilylpropyl) polysulfides. Use is made in particular, among these compounds, of bis(3-triethoxysilylpropyl) tetrasulfide, abbreviated to TESPT, of formula $[(C_2H_5O)_3Si(CH_2)_3S_2]_2$, or bis(3-triethoxysilylpropyl) disulfide, abbreviated to TESPD, of formula $[(C_2H_5O)_3Si(CH_2)_3S]_2$. Mention will also be made, as preferred examples, of bis(mono($C_1$-$C_4$)alkoxyldi($C_1$-$C_4$) alkylsilylpropyl) polysulfides (in particular disulfides, trisulfides or tetrasulfides), more particularly bis(monoethoxydimethylsilylpropyl) tetrasulfide, such as described in the abovementioned Patent Application WO 02/083782 (or U.S. Pat. No. 7,217,751).

Mention will in particular be made, as examples of coupling agents other than an alkoxysilane polysulfide, of bifunctional POSs (polyorganosiloxanes), or else of hydroxysilane polysulfides, such as described, for example, in Patent Applications WO 02/30939 (or U.S. Pat. No. 6,774, 255), WO 02/31041 (or US 2004/051210) and WO 2007/ 061550, or else of silanes or POSs bearing azodicarbonyl functional groups, such as described, for example, in Patent Applications WO 2006/125532, WO 2006/125533 and WO 2006/125534.

Mention will be made, as examples of other silane sulfides, for example, of silanes bearing at least one thiol (—SH) functional group ("mercaptosilanes") and/or at least one blocked thiol functional group, such as described, for example, in the patents or patent applications U.S. Pat. No. 6,849,754, WO 99/09036, WO 2006/023815, WO 2007/ 098080, WO 2010/072685 and WO 2008/055986.

Of course, use might also be made of mixtures of the coupling agents described above, as described in particular in the abovementioned Application WO 2006/125534.

The content of coupling agent is advantageously less than 20 phr, it being understood that it is generally desirable to use as little as possible of it. Typically, the content of coupling agent represents from 0.5% to 15% by weight, with respect to the amount of inorganic filler. Its content is preferably between 0.5 and 12 phr, more preferably within a range extending from 3 to 10 phr. This content is easily adjusted by a person skilled in the art depending on the content of inorganic filler used in the composition.

III.3. Various Additives:

The rubber compositions in accordance with embodiments of the invention can also contain coupling activators, agents for recovering the inorganic fillers or more generally processing aids capable, in a known way, by virtue of an improvement in the dispersion of the filler in the rubber matrix and of a lowering of the viscosity of the compositions, of improving their ability to be processed in the raw state, these agents being, for example, hydrolysable silanes, such as alkylalkoxysilanes, polyols, polyethers, primary, secondary or tertiary amines, or hydroxylated or hydrolysable polyorganosiloxanes.

The rubber compositions in accordance with embodiments of the invention can also comprise all or a portion of the normal additives customarily used in elastomer compositions intended for the manufacture of tires, such as, for example, pigments, protective agents, such as antiozone waxes, chemical antiozonants or antioxidants, antifatigue agents, reinforcing or plasticizing resins, methylene acceptors (for example, phenolic novolak resin) or methylene donors (for example, HMT or $H_3M$), such as described, for example, in Application WO 02/10269, a crosslinking system based either on sulfur or on sulfur donors and/or on peroxide and/or on bismaleimides, vulcanization accelerators, vulcanization activators, adhesion promoters, such as cobalt-based compounds, plasticizing agents, preferably non-aromatic or very slightly aromatic plasticizing agents selected from the group consisting of naphthenic oils, paraffinic oils, MES oils, TDAE oils, ether plasticizers, ester plasticizers, hydrocarbon resins exhibiting a high Tg, preferably of greater than 30° C., such as described, for example, in Applications WO 2005/087859, WO 2006/061064 and WO 2007/017060, and the mixtures of such compounds.

The rubber composition according to embodiments of the invention is manufactured in a way known per se in appropriate mixers.

III.4. Manufacture of the Rubber Composition:

The rubber composition in accordance with embodiments of the invention is manufactured in appropriate mixers, using two successive phases of preparation well known to a person skilled in the art: a first phase of thermomechanical working or kneading ("non-productive" phase) at high temperature, up to a maximum temperature of between 110° C. and 190° C., preferably between 130° C. and 180° C., followed by a second phase of mechanical working ("productive" phase) down to a lower temperature, typically of less than 110° C., for example between 40° C. and 100° C., during which finishing phase the crosslinking system is incorporated.

The process for preparing the rubber composition in accordance with embodiments of the invention advantageously comprises the following stages:

incorporating, in the diene elastomer, during a first "non-productive" stage, the other ingredients of the composition, including the reinforcing filler, with the exception of the crosslinking system, everything being kneaded thermomechanically until a maximum temperature of between 110° C. and 190° C. is reached;

cooling the combined mixture to a temperature of less than 100° C.;

subsequently incorporating, during a second "productive" stage, a crosslinking system;

kneading everything up to a maximum temperature of less than 110° C.

The final composition thus obtained is subsequently calendered, for example in the form of a sheet or plaque, in particular for laboratory characterization, or else extruded, in order to form, for example, a rubber profiled element used as rubber component in the preparation of the tire.

In the tire according to embodiments of the invention, the rubber composition described above advantageously makes up the tread.

Another subject-matter of embodiments of the invention is a semi-finished product made of rubber, advantageously a tread, comprising a rubber composition as described above.

Another subject-matter of embodiments of the invention is a composition comprising the substituted diene elastomer as described above or prepared by hydrosilylation or by a thiol-ene reaction according to the process described above and at least one of the following constituents:

a second diene elastomer;

a reinforcing filler and, if appropriate, a coupling agent.

This composition is advantageously a crosslinkable rubber composition.

The second diene elastomer and the reinforcing filler are as described above.

The abovementioned characteristics of the present invention, and also others, will be better understood on reading the following description of several exemplary embodiments of the invention, given by way of illustration and without limitation.

Example

Grafting Processes and Properties of the Grafted Elastomers

The starting elastomer is subjected to an antioxidizing treatment by addition of 0.4 part per hundred parts of elastomers (phr) of 4,4'-methylenebis(2,6-di(tert-butyl)phenol) and 0.4 part per hundred parts of elastomers (phr) of N-(1,3-dimethylbutyl)-N'-phenyl-p-phenylenediamine.

The grafted elastomers were synthesized in solution by two types of chemical reaction:

by hydrosilylation:

10 g of SBR are dissolved in 250 ml of toluene in a 500-ml reactor equipped with a mechanical stirrer and everything is placed under an inert (nitrogen) atmosphere. For ESi1: 13 mmol (4.1 g) of H—Si(CH$_3$)$_2$—(C$_{18}$H$_{37}$) and 200 µl of platinum-1,1,3,3-tetramethyl-1,3-divinylsiloxane in solution in xylene (Karstedt's catalyst) (CAS No.: 68478-92-2) are added to the polymer solution and the reaction medium is heated to 60° C.

For ESi2: 26 mmol (8.2 g) of H—Si(CH$_3$)$_2$—(C$_{18}$H$_{37}$) and 400 µl of platinum-1,1,3,3-tetramethyl-1,3-divinylsiloxane in solution in xylene (Karstedt's catalyst) (CAS No.: 68478-92-2) are added to the polymer solution and the reaction medium is heated to 60° C.

For the two elastomers:

After stirring at 60° C. for 24 h, the reaction medium is allowed to return to ambient temperature. Once the reaction medium has returned to ambient temperature, it is subsequently coagulated in 250 ml of methanol.

The redissolved elastomer is subsequently subjected to an antioxidizing treatment with 0.4 part per hundred parts of elastomers (phr) of 4,4'-methylenebis(2,6-di(tert-butyl)phenol) and 0.4 part per hundred parts of elastomers (phr) of N-(1,3-dimethylbutyl)-N'-phenyl-p-phenylenediamine.

The modified SBR is dried by placing in an oven under vacuum (200 torr) at 60° C. for 1 day.

The reaction is monitored by $^1$H NMR spectroscopy and the monitoring is confirmed by the reduction in or the disappearance of the signals for the vinyl unsaturations (δ=4.9 ppm: =CH$_2$). The grafting yield is 67% for ESi1 and 47% for ESi2 respectively. The grafting yield is the amount by weight of hydrosilane derivative grafted with respect to the amount by weight of hydrosilane introduced.

by a thiol-ene reaction (ES1):

10 g of SBR are dissolved in 250 ml of methylcyclohexane in a 500-ml reactor equipped with a mechanical stirrer and everything is placed under an inert (nitrogen) atmosphere. 29 mmol (8.3 g) of C$_{18}$H$_{37}$SH are dissolved in 56 ml of dichloromethane. 0.18 g of lauroyl peroxide are dissolved in 30 ml of methylcyclohexane.

The thiol solution and the initiator solution are added to the polymer solution and the reaction medium is heated to 80° C.

After stirring at 80° C. for 24 hours, the reaction medium is allowed to return to ambient temperature. Once the reaction medium has returned to ambient temperature, it is subsequently coagulated in 250 ml of methanol and then rinsed with 250 ml of methanol.

The redissolved elastomer is subsequently subjected to an antioxidizing treatment with 0.4 part per hundred parts of elastomers (phr) of 4,4'-methylenebis(2,6-di(tert-butyl)phenol) and 0.4 part per hundred parts of elastomers (phr) of N-(1,3-dimethylbutyl)-N'-phenyl-p-phenylenediamine.

The substituted SBR is dried by placing in an oven under vacuum (200 torr) at 60° C. for 1 day.

The reaction is monitored by $^1$H NMR spectroscopy and the monitoring is confirmed by the reduction in or the disappearance of the signals for the vinyl unsaturations (δ=4.9 ppm: =C$\underline{H}_2$). The grafting yield is 20% for ES1. The grafting yield is the amount of thiol derivative grafted with respect to the amount of thiol introduced.

Four elastomers are studied:

CE=unmodified styrene/butadiene elastomer (SBR),

ES1: SBR grafted by a thiol-ene reaction

ESi1, ESi2: SBRs grafted by hydrosilylation according to a degree of grafting shown in the following table:

TABLE 1

|  | CE | ESi1 | ESi2 | ES1 |
|---|---|---|---|---|
| Graft | None | C$_{18}$H$_{37}$Si*(CH$_3$)$_2$ | | C$_{18}$H$_{37}$S* |
| % by weight Styrene | 29.1 | 22.9 | 21.1 | 24.2 |

TABLE 1-continued

|  | CE | ESi1 | ESi2 | ES1 |
|---|---|---|---|---|
| % by weight PB | 70.9 | 51.9 | 46.5 | 55.6 |
| % by weight grafted units | 0 | 3.7 | 4.7 | 3.2 |
| % by weight of graft | 0 | 21.5 | 27.7 | 17.0 |

% by weight grafted units=1,2-PB units after hydrosilylation reaction but without the weight of the graft, that is to say of formula:

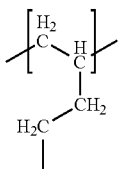

% by weight of pendant group (I)=(% by weight of the plasticizer of formula (I)/(% by weight of the plasticizer of formula (I)+% by weight of the SBR before grafting)

Control mixtures are produced from ungrafted SBR and free plasticizers according to the proportions by weight given in the following table (% of plasticizer by weight=% by weight of the plasticizer/(% by weight of the plasticizer+% by weight of the ungrafted SBR)).

In all these control mixtures, the SBR exhibits the same distribution of styrene units and of butadiene (PB) units as that shown for the SBR in Table 1.

The formulations of the control mixtures (CS1, CSi1, CSi2, CPS, CPSi) are given the following table:

TABLE 2

| Name | CSi1 | CSi2 | CPSi | CS1 | CPS |
|---|---|---|---|---|---|
| Plasticizer | $C_{18}H_{37}SiH(CH_3)_2$ | | | $C_{18}H_{37}SH$ | |
| % of plasticizer by weight | 21.5 | 27.7 | 100 | 17.0 | 100 |

The thermal properties of each of these elastomers or of these mixtures were analysed by DSC (20° C./min), in particular the Tg and the crystallization of the pendant groups (I) or of the free plasticizers in the formulation.

The results are given in the following tables:

TABLE 3

| | Name | | | | |
|---|---|---|---|---|---|
| | CE | ESi1 | CSi1 | ESi2 | CSi2 | CPSi |
| Tg (° C.) | −34.3 | −44.3 | −41.0 | −43.0 | −40.4 | — |
| Enthalpy of crystallization (J/g) | 0 | 8.0 | 32.2 | 18.8 | 40.1 | 188.7 |
| Melting point (° C.) | — | −20.2 | 17.8 | −16.6 | 19.4 | 22.5 |

TABLE 4

| Name | CE | ES1 | CS1 | CPS |
|---|---|---|---|---|
| Tg (° C.) | −34 | −39 | −39 | — |
| Enthalpy of crystallization (J/g) | 0 | 0 | 33.0 | 188.7 |
| Melting point (° C.) | — | — | 14.3 | 22.5 |

The grafting of the $C_{18}$ alkyl chains makes it possible to increase the compatibility of this plasticizer with the elastomer, in particular to greatly decrease the crystallization of the grafts (with respect to the free $C_{18}H_{37}Si(CH_3)_2H$ or free $C_{18}H_{37}SH$ plasticizer). The $C_{18}$ grafting of the plasticizer makes it possible in addition to accentuate or maintain the fall in the Tg in comparison with this same free plasticizer.

The grafted plasticizer.

makes possible an increase in the compatibility of the plasticizer, in particular a decrease in the crystallinity (enthalpy of fusion) of the plasticizer, in comparison with a free plasticizer, makes possible a fall in the Tg of the elastomer which is accentuated or maintained, in comparison with a free plasticizer, makes it possible to prevent exudation of the plasticizers towards the outside of the tire or towards the internal mixtures.

The stiffnesses of the elastomers (CE, ESi1, ESi2) and of the control mixtures (CSi1, CSi2) were measured and the results are given in the following table (expressed in base 100 with respect to the control):

TABLE 5

| G*(40° C.) | CE | ESi1 | CSi1 | ESi2 | CSi2 |
|---|---|---|---|---|---|
| Dilution with respect to the starting SBR in base 100 (G*/G*CE) | 100 | 54 | 58 | 46 | 47 |

The elastomers grafted with a plasticizer confer the same plasticizing properties as the SBR+free plasticizer control mixture.

The stiffnesses of the elastomers (CE, ES1) and of the control mixture (CS1) were measured and the results are given in the following table (expressed in base 100 with respect to the control):

TABLE 6

| G*(40° C.) | CE | ES1 | CS1 |
|---|---|---|---|
| Dilution with respect to the starting SBR in base 100 (G*/G*CE) | 100 | 74 | 52 |

The elastomers grafted with a plasticizer confer plasticizing properties.

The invention claimed is:

1. A tire comprising a rubber composition comprising a substituted diene elastomer, wherein the substituted diene elastomer comprises units bearing an A-B radical, in which:
   A represents an aliphatic $C_3$-$C_{35}$ radical which can be interrupted by one or more heteroatom(s)
   B represents a linear, branched or cyclic $C_1$-$C_6$ hydrocarbon radical
   A and B are such that the melting point of the analogue, H-A-B, is less than 70° C. and the substituted diene elastomer comprises from 10% to 40% by weight of the A-B radical, with respect to the total weight of the elastomer.

2. A tire according to claim 1, wherein A represents a $C_{10}$-$C_{25}$ radical which can be interrupted by one or more heteroatom(s).

3. A tire according to claim 1, wherein A represents a linear $C_{10}$-$C_{25}$ alkylene radical.

4. A tire according to claim 1, wherein B represents a methyl, cyclopentyl or cyclohexyl radical.

5. A tire according to claim 1, wherein the A-B radical is bonded to the chain of the elastomer via a sulfur atom or a silicon atom.

6. A tire according to claim 5, wherein the elastomer comprises pendant groups distributed along the chain of following formula (1): *—SiR$_1$R$_2$-A-B
with:
R$_1$ and R$_2$, which are identical or different, each representing a C$_1$-C$_5$ alkyl, C$_6$-C$_{14}$ aryl or C$_7$-C$_{11}$ aromatic alkyl group;
A representing an aliphatic C$_3$-C$_{35}$ radical which can be interrupted by one or more heteroatom(s);
B representing a linear, branched or cyclic C$_1$-C$_6$ hydrocarbon radical;
* denoting a point of bonding with the elastomer chain.

7. A tire according to claim 5, wherein the substituted diene elastomer is obtained by hydrosilylation of a diene elastomer E, by reacting the diene elastomer E with a hydrosilane of formula (2) H—SiR$_1$R$_2$-A-B, where R$_1$ and R$_2$, which are identical or different, each represent a C$_1$-C$_5$ alkyl, C$_6$-C$_{14}$ aryl or C$_7$-C$_{11}$ aromatic alkyl group, A represents an aliphatic C$_3$-C$_{35}$ radical which can be interrupted by one or more heteroatom(s), B represents a linear, branched or cyclic C$_1$-C$_6$ hydrocarbon radical, and the reacting step is in the presence of a hydrosilylation catalyst.

8. A tire according to claim 5, wherein the elastomer comprises pendant groups distributed along the chain of following formula (3): *—S-A-B
with:
A representing an aliphatic C$_3$-C$_{35}$ radical which can be interrupted by one or more heteroatom(s);
B representing a linear, branched or cyclic C$_1$-C$_6$ hydrocarbon radical;
* denoting a point of bonding with the elastomer chain.

9. A tire according to claim 8, wherein the substituted diene elastomer is obtained by reacting a diene elastomer E with a thiol of formula (4) HS-A-B, where A represents an aliphatic C$_3$-C$_{35}$ radical which can be interrupted by one or more heteroatom(s), B represents a linear, branched or cyclic C$_1$-C$_6$ hydrocarbon radical, and the reacting step is in the presence of a radical initiator.

10. A tire according to claim 7, wherein the diene elastomer E is one of the following polymers:
(a) any homopolymer obtained by polymerization of a conjugated diene monomer having from 4 to 12 carbon atoms;
(b) any copolymer obtained by copolymerization of one or more of the conjugated dienes with one another or with one or more ethylenically unsaturated monomers;
(c) any homopolymer obtained by polymerization of a non-conjugated diene monomer having from 5 to 12 carbon atoms;
(d) any copolymer obtained by copolymerization of one or more of the non-conjugated dienes with one another or with one or more ethylenically unsaturated monomers;
(e) a ternary copolymer obtained by copolymerization of ethylene and of an α-olefin having from 3 to 6 carbon atoms with a non-conjugated diene monomer having from 6 to 12 carbon atoms;
(f) a copolymer of isobutene and of isoprene (butyl rubber), and also the halogenated versions;
(g) natural rubber;
(h) an unsaturated olefinic copolymer, the chain of which comprises at least olefinic monomer units and diene units;
(i) a mixture of several of the elastomers defined from (a) to (h) with one another.

11. A tire according to claim 10, wherein the conjugated diene monomer is 1,3-butadiene, 2-methyl-1,3-butadiene, 2,3-di(C$_1$-C$_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene, 1,3-pentadiene or 2,4-hexadiene.

12. A tire according to claim 10, wherein the diene elastomer E is chosen from:
polybutadienes (abbreviated to "BRs"),
synthetic polyisoprenes (IRs),
natural rubber (NR),
random butadiene copolymers, random isoprene copolymers, random ethylene/diene copolymers, and
the mixtures of these elastomers.

13. A tire according to claim 1, wherein the rubber composition comprises from 50% to 70% by weight of the substituted diene elastomer.

14. A tire according to claim 1, wherein the rubber composition comprises from 45 to 160 phr of reinforcing filler.

15. A tire according to claim 1, wherein the rubber composition also comprises a second diene elastomer.

16. A tire according to claim 1, wherein the rubber composition makes up the tread.

17. A tread comprising a rubber composition, the rubber composition comprising a substituted diene elastomer, wherein the substituted diene elastomer comprises units bearing an A-B radical, in which:
A represents an aliphatic C$_3$-C$_{35}$ radical which can be interrupted by one or more heteroatom(s)
B represents a linear, branched or cyclic C$_1$-C$_6$ hydrocarbon radical
A and B are such that the melting point of the analogue, H-A-B, is less than 70° C. and the substituted diene elastomer comprises from 10% to 40% by weight of the A-B radical, with respect to the total weight of the elastomer.

18. A rubber composition comprising a substituted diene elastomer, said substituted diene elastomer comprising units bearing an A-B radical, in which:
A represents an aliphatic C$_3$-C$_{35}$ radical which can be interrupted by one or more heteroatom(s)
B represents a linear, branched or cyclic C$_1$-C$_6$ hydrocarbon radical,
and the composition including at least one of the following constituents:
a second diene elastomer;
a reinforcing filler and, if appropriate, a coupling agent.

19. A tire according to claim 9, wherein the diene elastomer E is one of the following polymers:
(a) any homopolymer obtained by polymerization of a conjugated diene monomer having from 4 to 12 carbon atoms;
(b) any copolymer obtained by copolymerization of one or more of the conjugated dienes with one another or with one or more ethylenically unsaturated monomers;
(c) any homopolymer obtained by polymerization of a non-conjugated diene monomer having from 5 to 12 carbon atoms;
(d) any copolymer obtained by copolymerization of one or more of the non-conjugated dienes with one another or with one or more ethylenically unsaturated monomers;
(e) a ternary copolymer obtained by copolymerization of ethylene and of an α-olefin having from 3 to 6 carbon atoms with a non-conjugated diene monomer having from 6 to 12 carbon atoms;
(f) a copolymer of isobutene and of isoprene (butyl rubber), and also the halogenated versions;

(g) natural rubber;
(h) an unsaturated olefinic copolymer, the chain of which comprises at least olefinic monomer units and diene units;
(i) a mixture of several of the elastomers defined from (a) to (h) with one another.

20. A tire according to claim 19, wherein the diene elastomer E is chosen from:
polybutadienes (abbreviated to "BRs"),
synthetic polyisoprenes (IRs),
natural rubber (NR),
random butadiene copolymers, random isoprene copolymers, random ethylene/diene copolymers, and
the mixtures of these elastomers.

21. A tire according to claim 12 wherein butadiene copolymers, isoprene copolymers and ethylene/diene copolymers are selected from the group consisting of butadiene/styrene copolymers (SBRs), isoprene/butadiene copolymers (BIRs), isoprene/styrene copolymers (SIRs), isoprene/butadiene/styrene copolymers (SBIRs) and ethylene/butadiene copolymers (EBRs).

\* \* \* \* \*